(12) United States Patent
Ishiwari

(10) Patent No.: US 10,871,759 B2
(45) Date of Patent: Dec. 22, 2020

(54) MACHINING TIME PREDICTION DEVICE FOR PREDICTING AN EXECUTION TIME FOR TOOL CHANGE

(71) Applicant: FANUC Corporation, Yamanashi (JP)

(72) Inventor: Hisateru Ishiwari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 72 days.

(21) Appl. No.: 16/257,119

(22) Filed: Jan. 25, 2019

(65) Prior Publication Data

US 2019/0235467 A1 Aug. 1, 2019

(30) Foreign Application Priority Data

Jan. 26, 2018 (JP) ................................. 2018-011941

(51) Int. Cl.
*G05B 19/402* (2006.01)

(52) U.S. Cl.
CPC .. *G05B 19/402* (2013.01); *G05B 2219/31407* (2013.01); *G05B 2219/50126* (2013.01)

(58) Field of Classification Search
CPC ........ G05B 2219/31407; G05B 19/402; G05B 19/406; G05B 2219/50126; B23Q 17/00
See application file for complete search history.

(56) References Cited

U.S. PATENT DOCUMENTS

| 4,497,029 | A * | 1/1985 | Kiyokawa | G05B 19/182 318/563 |
|---|---|---|---|---|
| 7,027,889 | B2 * | 4/2006 | Nakamura | G05B 19/4097 700/173 |
| 7,212,876 | B2 * | 5/2007 | Blumenfeld | G05B 19/41865 700/99 |
| 10,222,782 | B2 * | 3/2019 | Oohashi | G05B 19/4065 |
| 2002/0013639 | A1 * | 1/2002 | Fujishima | B23Q 41/08 700/175 |
| 2004/0193307 | A1 * | 9/2004 | Fujishima | G05B 23/0283 700/177 |
| 2005/0228533 | A1 * | 10/2005 | Hioki | G05B 19/4103 700/159 |
| 2009/0036282 | A1 * | 2/2009 | Yasuda | B23Q 11/0891 483/56 |
| 2017/0090430 | A1 | 3/2017 | Nakazawa | |

(Continued)

FOREIGN PATENT DOCUMENTS

| JP | H05277866 A | 10/1993 |
|---|---|---|
| JP | 2005-193312 A | 7/2005 |

(Continued)

*Primary Examiner* — Chun Cao
(74) *Attorney, Agent, or Firm* — Hauptman Ham, LLP

(57) ABSTRACT

A device configured to predict an execution time of an auxiliary function for tool change extracts an auxiliary function command for tool change from a machining program, calculates the storage position of a before-exchange tool and the storage position of an after-exchange tool, based on the auxiliary function command, and calculates a distance between tools, based on the results of the calculation. Also, the prediction device predicts the execution time of the auxiliary function command for tool change with reference to a database in which the distance between tools is associated with an actual value of the auxiliary function execution time for tool change.

11 Claims, 10 Drawing Sheets

(56) References Cited

U.S. PATENT DOCUMENTS

2018/0026573 A1   1/2018   Akashi et al.
2019/0121325 A1*  4/2019   Oohashi ................ B23O 3/155

FOREIGN PATENT DOCUMENTS

| JP | 2014-204622 A | 10/2014 |
| JP | 2017-64837 A | 4/2017 |
| JP | 2018-14838 A | 1/2018 |

* cited by examiner

FIG.3

| No. | COMMAND CODE | STORAGE POSITION OF BEFORE-EXCHANGE TOOL | STORAGE POSITION OF AFTER-EXCHANGE TOOL | DISTANCE BETWEEN TOOLS | EXECUTION TIME |
|---|---|---|---|---|---|
| 1 | M6T1 | 3 | 1 | 2 | 30 |
| 2 | M6T5 | 1 | 5 | 4 | 50 |
| 3 | M6T3 | 5 | 3 | 2 | 33 |
| 4 | M6T1 | 3 | 1 | 2 | 31 |

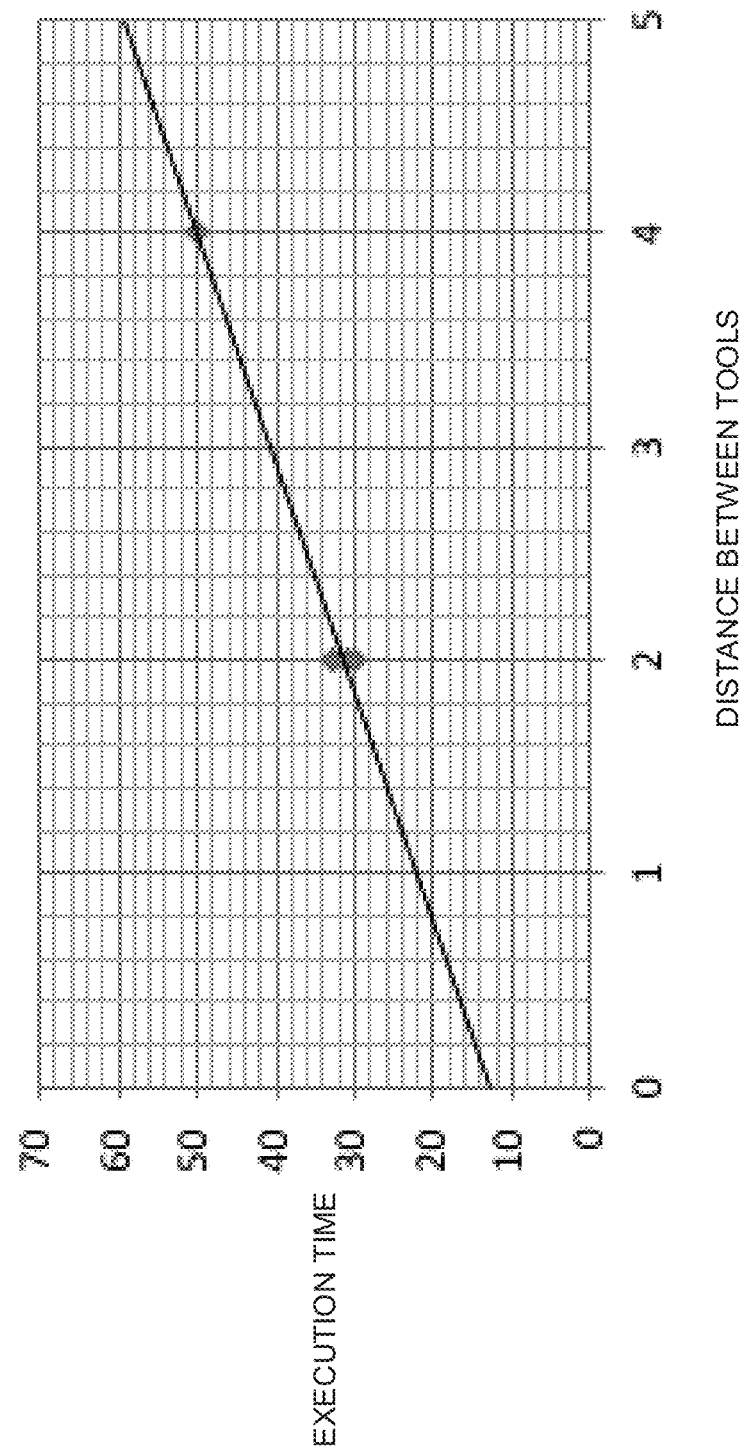

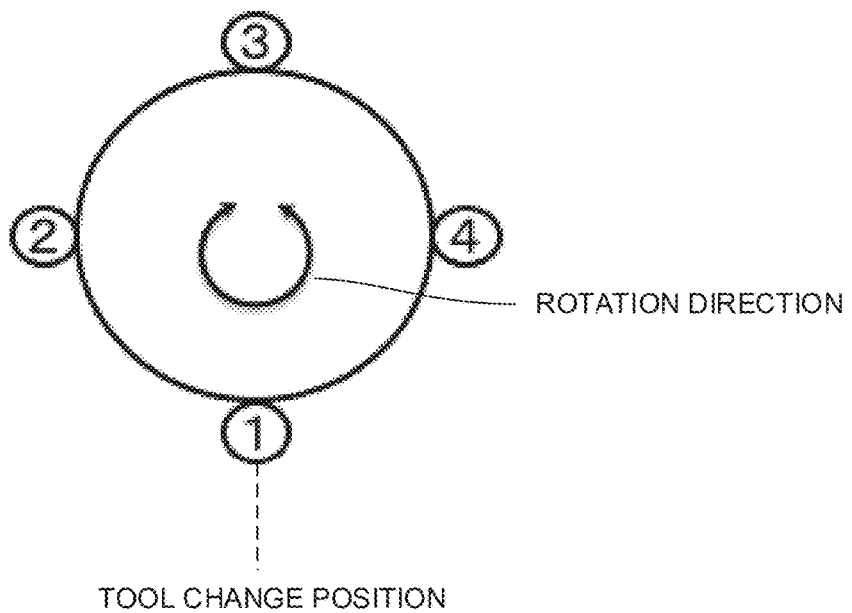

MACHINING TIME PREDICTION DEVICE FOR PREDICTING AN EXECUTION TIME FOR TOOL CHANGE

RELATED APPLICATIONS

The present application claims priority of Japanese Application Number 2018-011941, filed on Jan. 26, 2018, the disclosure of which is hereby incorporated by reference herein in its entirety.

BACKGROUND OF THE INVENTION

Field of the Invention

The present invention relates to a machining time prediction device, and more particularly, to a machining time prediction device configured to calculate an auxiliary function execution time for tool change.

Description of the Related Art

A machining time prediction device is a known device having a function of predicting a machining time according to a machining program. The machining time prediction device can obtain the machining time by calculation, using conditions such as the feed rate and acceleration/deceleration time constants and the same logic as a numerical controller without performing actual machining.

However, the execution time of an auxiliary function for tool change or the like cannot be calculated by the machining time prediction device. Conventionally, therefore, the execution time of the auxiliary function is obtained by actual measurement or by using theoretical values.

Japanese Patent Application Laid-Open No. 2005-193312 describes a device that actually measures and displays the ratio of cutting time to cycle time for each tool.

While the device described in Japanese Patent Application Laid-Open No. 2005-193312 measures the tool change time for each tool, it is not always appropriate to use the resulting measured value directly for the prediction of the tool change time. This is because the execution time of the auxiliary function for tool change varies depending on the tool type and various other factors. For example, the tool change time can vary according to the structure of a machine, the shape and rotation direction of a tool storage device, and those positions in the tool storage device in which the tools are stored. Therefore, the execution time may sometimes vary depending on the situation despite the use of identical auxiliary codes (codes for executing the auxiliary function for tool change). Thus, there is a demand for a method to calculate the auxiliary function execution time for tool change more accurately.

SUMMARY OF THE INVENTION

The present invention has been made to solve the above problem and has an object to provide a machining time prediction device configured to calculate an auxiliary function execution time for tool change.

A machining time prediction device according to the present invention is configured to predict an execution time of an auxiliary function for tool change. The machining time prediction device includes: a tool change auxiliary function command extraction unit configured to extract an auxiliary function command for tool change from a machining program; a tool position calculation unit for positions before and after tool change configured to calculate the storage position of a before-exchange tool and the storage position of an after-exchange tool, based on the auxiliary function command; an inter-tool distance calculation unit configured to calculate a distance between tools, based on the storage position of a before-exchange tool and the storage position of an after-exchange tool; and a tool change time prediction unit configured to predict the execution time of the extracted auxiliary function command for tool change with reference to a database in which the distance between tools is associated with an actual value of the auxiliary function execution time for tool change.

The tool change time prediction unit may perform the prediction based on data of the database which includes the same distance between tool as the distance between tools that is calculated by the inter-tool distance calculation unit.

The database may associate the storage position of a before-exchange tool and the storage position of an after-exchange tool with the actual value of the auxiliary function execution time for tool change, and the tool change time prediction unit may perform the prediction based on data of the database which includes the storage position of a before-exchange tool and the storage position of an after-exchange tool being the same as the storage position of a before-exchange tool and the storage position of an after-exchange tool which are calculated by the tool position calculation unit for positions before and after tool change.

The tool change time prediction unit may perform the prediction by using an approximate expression generated based on the database.

According to the present invention, there can be provided a machining time prediction device configured to calculate an auxiliary function execution time for tool change.

BRIEF DESCRIPTION OF THE DRAWINGS

FIG. 3 is a diagram showing an example of a database constituting the machining time prediction system shown in FIG. 2;

FIG. 7 is a diagram illustrating an operation of a tool change time prediction unit;

FIG. 8 is a diagram showing an example of the tool changer;

FIG. 9 is a diagram showing an example of data to which an inter-tool distance calculation unit refers;

DETAILED DESCRIPTION OF THE PREFERRED EMBODIMENTS

A configuration of a machining time prediction device 1 according to Embodiment 1 of the present invention will be described first.

Figure 1:
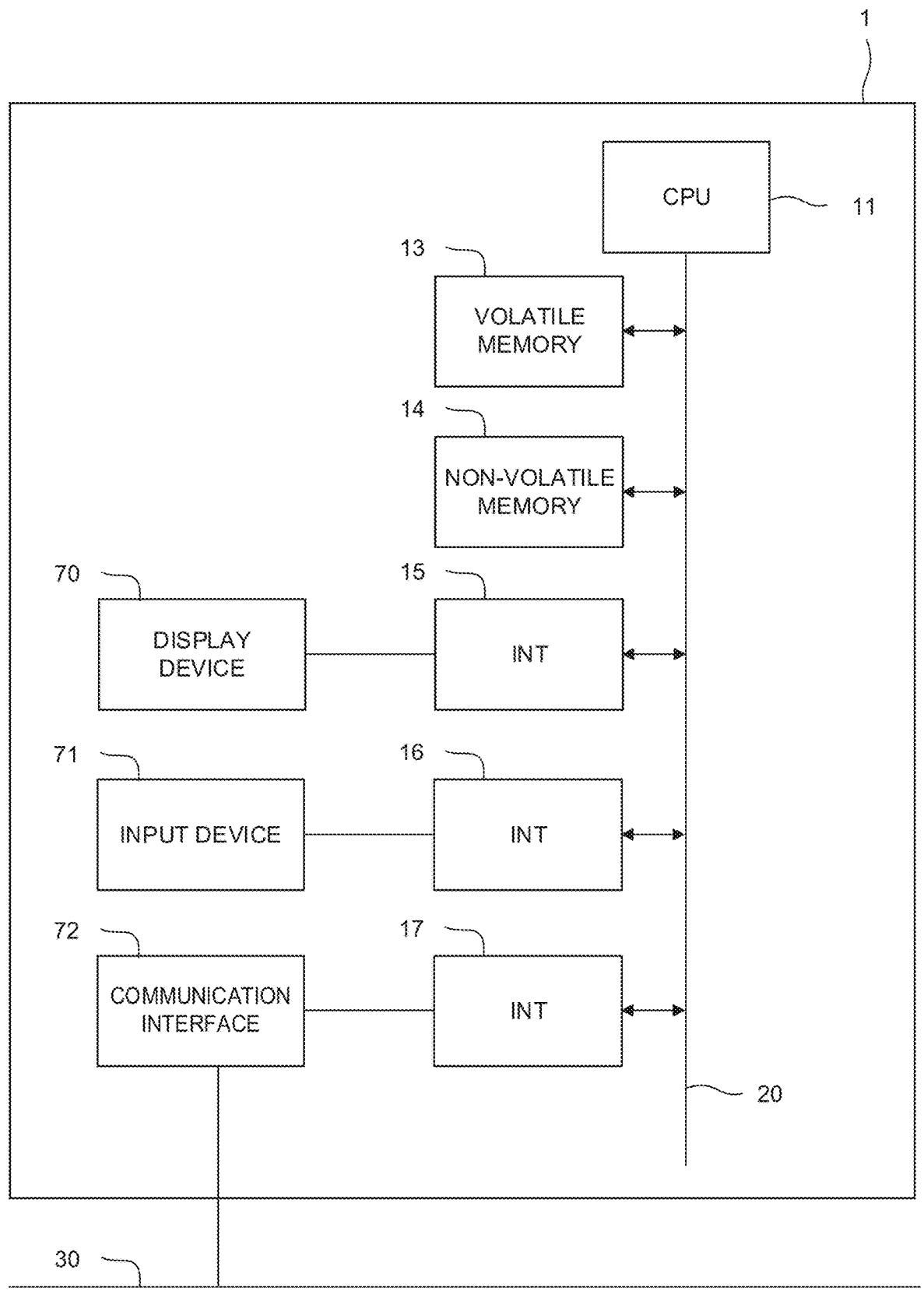
FIG. 1 is a block diagram showing a hardware configuration of a machining time prediction device.

FIG. 1 is a schematic hardware configuration of the principal part of the machining time prediction device 1 according to Embodiment 1 of the present invention.

The machining time prediction device 1 can be constructed, for example, as a function included in an information processing device such as a CPU, an information processing system using a virtual environment such as a cloud, or a numerical controller. In any case, however, it typically has a hardware configuration such as that shown in FIG. 1.

A CPU 11 of the machining time prediction device 1 is a processor for generally controlling the machining time prediction device 1. The CPU 11 reads out a program stored in a non-volatile memory 14 through a bus 20 and controls the entire machining time prediction device 1 according to the program.

The non-volatile memory 14 is constructed, for example, as a memory that is backed up by a battery (not shown) so that its storage state can be retained even when the machining time prediction device 1 is powered off. Programs and data stored in the non-volatile memory 14 may be developed in a volatile memory 13 during use. The volatile memory 13 is loaded with temporary calculation data and display data, data input through an input device 71, and the like, as well as the programs and data developed from the non-volatile memory 14.

A display device 70 is a data output device such as a display. Display data output from the CPU 11 is displayed on the display of the display device 70 through an interface 15.

The input device 71 is a data input device such as a keyboard. Commands and data input from the keyboard of the input device 71 are delivered to the CPU 11 through an interface 16.

A communication interface 72 is a communication interface for connecting the machining time prediction device 1 and an external device (e.g., database). The communication interface 72 acquires, through an interface 17, transmission data output from the CPU 11 and outputs the acquired data to a communication network 30. Moreover, the communication interface 72 receives data from the communication network 30 and delivers the received data to the CPU 11 through the interface 17.

The communication network 30 can be an information communication infrastructure such as FIELD SYSTEM. Typically, the machining time prediction device 1 is connected for communication with external databases through the communication network 30.

Figure 2:
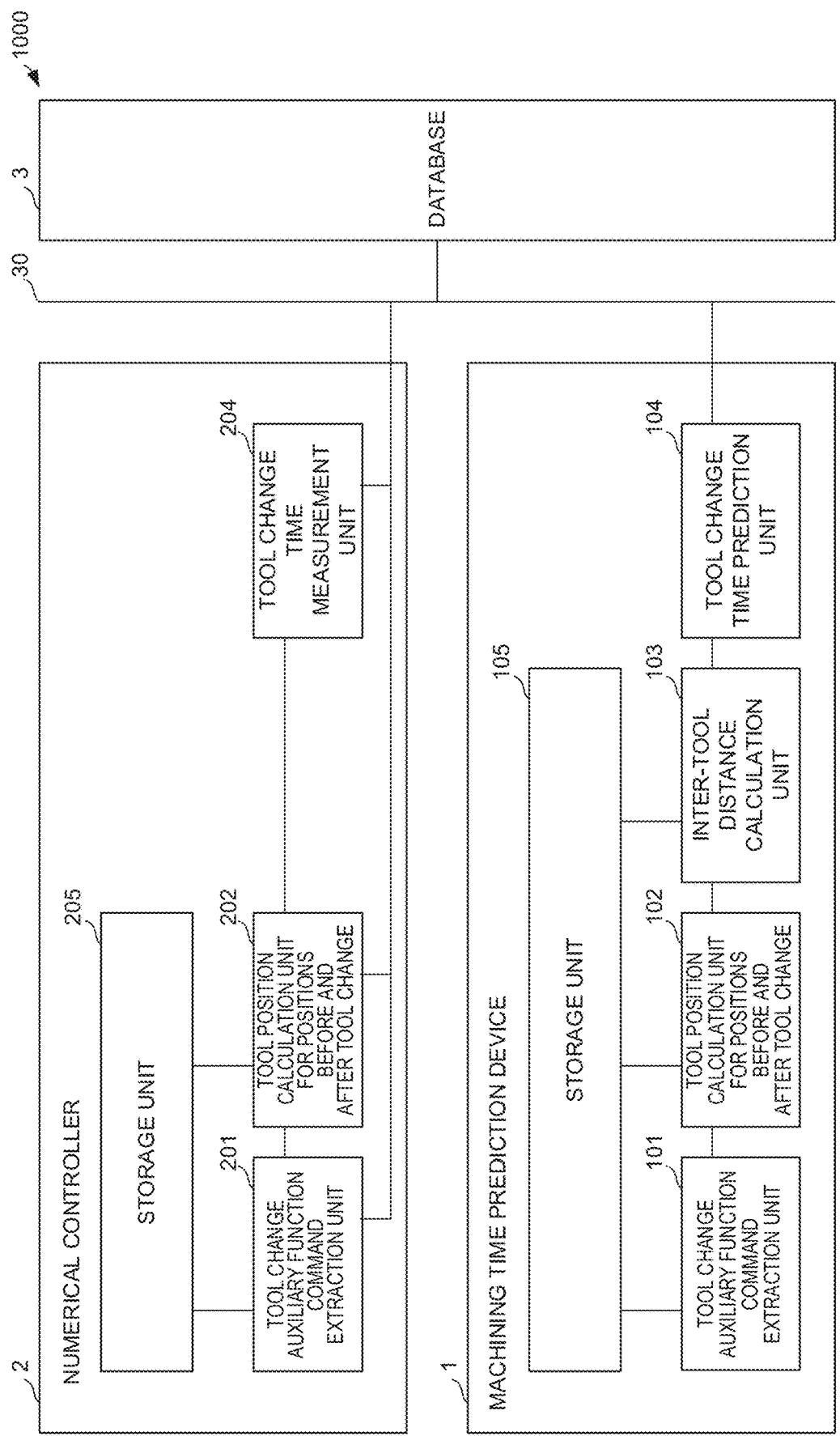
FIG. 2 is a block diagram showing a functional configuration of a machining time prediction system including the machining time prediction device.

FIG. 2 is a block diagram showing a schematic functional configuration of a machining time prediction system 1000 including the machining time prediction device 1 according to Embodiment 1 of the present invention.

The machining time prediction system 1000 includes the machining time prediction device 1, a numerical controller 2, and a database 3. The machining time prediction device 1, numerical controller 2, and database 3 are connected for intercommunication with one another by the communication network 30.

The machining time prediction device 1 performs prediction processing for an auxiliary function execution time for tool change, which is processing characteristic of the present invention. The machining time prediction device 1 includes a cool change auxiliary function command extraction unit 101, tool position calculation unit 102 for positions before and after tool change, inter-tool distance calculation unit 103, tool change time prediction unit 104, and storage unit 105.

The tool change auxiliary function command extraction unit 101 analyzes a machining program and extracts an auxiliary function command for tool change.

The tool position calculation unit 102 for positions before and after tool change acquires the storage position of a before-exchange tool (or a tool in a tool change position) and the storage position of an after-exchange tool (or a tool scheduled to move to the tool change position by tool change) when an auxiliary function for tool change is executed.

The inter-tool distance calculation unit 103 obtains a distance between tools, based on the storage position of an before-exchange tool and the storage position of an after-exchange tool that are obtained by the tool position calculation unit 102.

The tool change time prediction unit 104 predicts the execution time of the auxiliary function command for tool change based on the distance between tools that is obtained by the inter-tool distance calculation unit 103 and the database 3 (described later).

The storage unit 105 is a storage area that holds data such as the machining program, the respective storage positions of all tools in a tool changer, and the tool change position in the tool changer.

The numerical controller 2 executes various steps of processing for generating the database 3 that are required for the machining time prediction device 1 to perform the prediction processing for the auxiliary function execution time for tool change. The numerical controller 2 includes a tool change auxiliary function command extraction unit 201, tool position calculation unit 202 for positions before and after tool change, tool change time measurement unit 204, and storage unit 205.

The tool change auxiliary function command extraction unit 201 extracts the auxiliary function command for tool change from the machining program during execution of the machining program or the like.

The tool position calculation unit 202 for positions before and after tool change acquires the storage position of a before-exchange tool (or a tool in a tool change position) and the storage position of an after-exchange tool (or a tool scheduled to move to the tool change position by tool change).

The tool chance time measurement unit 204 measures the required for the execution of the auxiliary function for tool change when the auxiliary function for tool change is executed. Moreover, the tool change time measurement unit 204 saves, in the database 3, the measured value of this execution time, the auxiliary function command for tool change extracted by the tool change auxiliary function command extraction unit 201, and the storage position of a before-exchange tool (or a tool in a tool change position) and the storage position of an after-exchange tool (or a tool scheduled to move to the tool change position by tool change) that are acquired by the tool position calculation unit 202 for positions before and after tool change, in a mutually associated manner.

The storage unit 205 is a storage area that holds data such as the machining program, the respective storage positions of all the tools in the tool changer, and the tool change position in the tool changer.

The database 3 is a storage device in which various data required for the machining time prediction device 1 to perform the prediction processing for the auxiliary function execution time for tool change are accumulated. The database 3 includes at least the distance between tools and the execution time or information required for the calculation of these pieces of information.

FIG. 3 shows an example of the stored contents of the database 3.

The database 3 holds a command (auxiliary function command for tool change) code, the storage position (numbers) of a before-exchange tool and the storage position (number) of an after-exchange tool, the execution time of the command, and a distance between tools, as a single record, in a manner such that they are associated with each other. The distance between tools is a value indicative of the distance between the storage position of a before-exchange tool and the storage position of an after-exchange tool. In this example, the absolute value of the difference between the numbers of the storage position of a before-exchange tool and the number of the storage position of an after-exchange tool is adopted as the distance between tools.

The database 3 need not necessarily be a device independent of the machining time prediction device 1 and the numerical controller 2 and may be included in the machining time prediction device 1 or the numerical controller 2.

Figure 4:
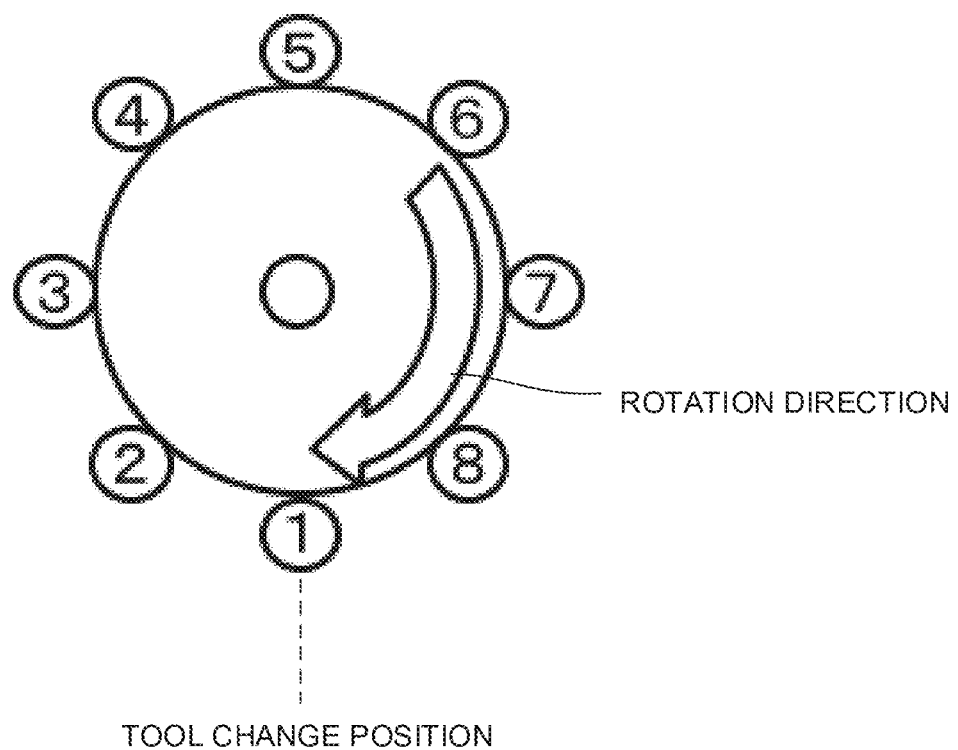
FIG. 4 is a diagram showing an example of a tool changer.

FIG. 4 is a schematic diagram of an example of the tool changer.

This tool changer is circular in shape and can mount tools individually in tool storage positions Nos. 1 to 8 arranged at regular intervals on the circumference of a circle. The 6 o'clock position of the tool changer is a tool change position and each tool located in this tool change position is used for machining. The tool changer is rotatable in a predetermined direction (clockwise in this example). As it rotates, the tool in the tool change position is sequentially changed. In this way, the tools used for machining are replaced with one another.

In this example, Tool No. 1 is currently located in the tool change position. Now let us assume that the auxiliary function for tool change for commanding change to Tool. No. 6 is executed. In response to this, the tool changer rotates clockwise so that. Tool No. 6 is located in the tool change position.

Figure 5:
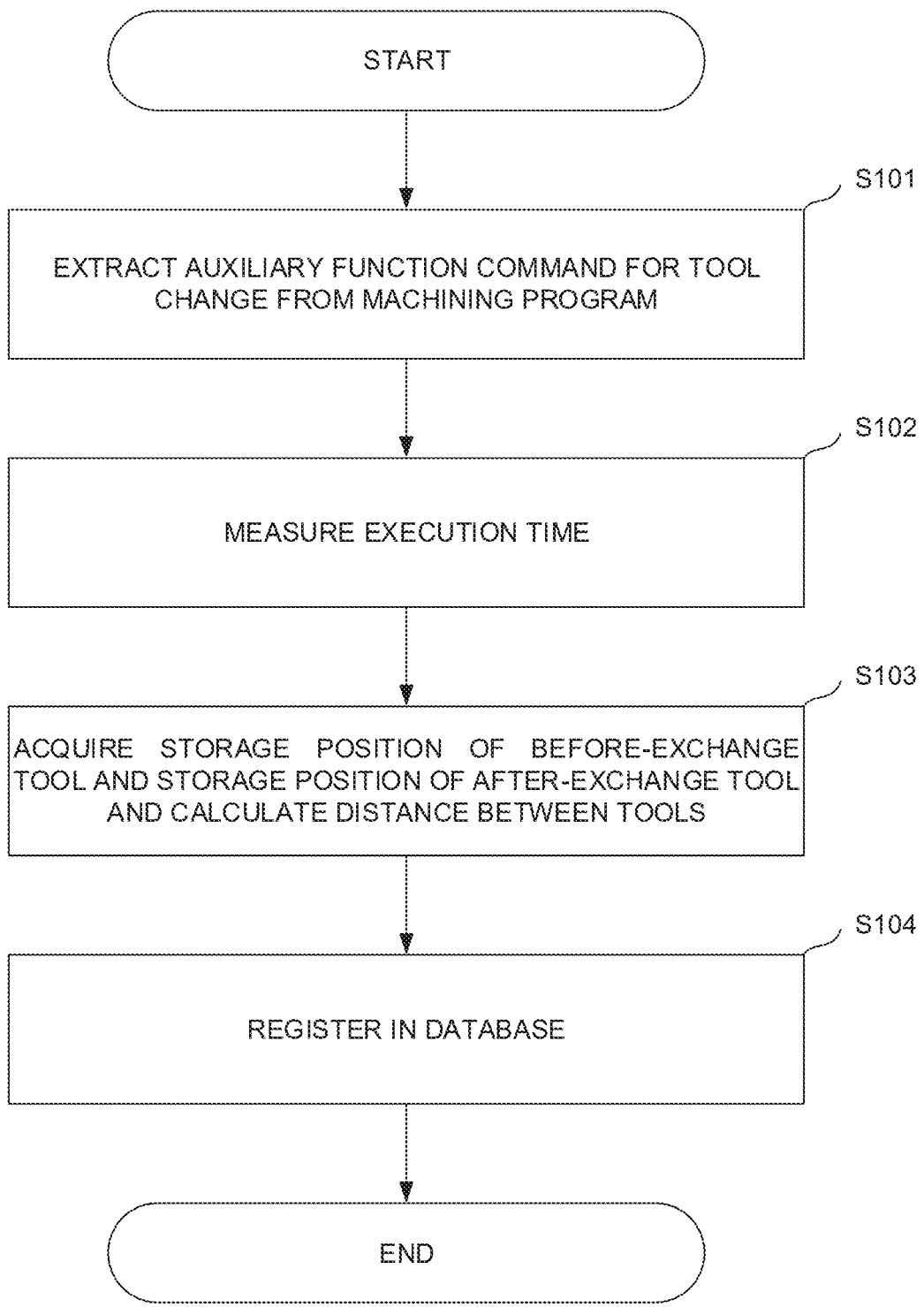
FIG. 5 is a flowchart showing an operation of the machining time prediction system including the machining time prediction device.
Figure 6:
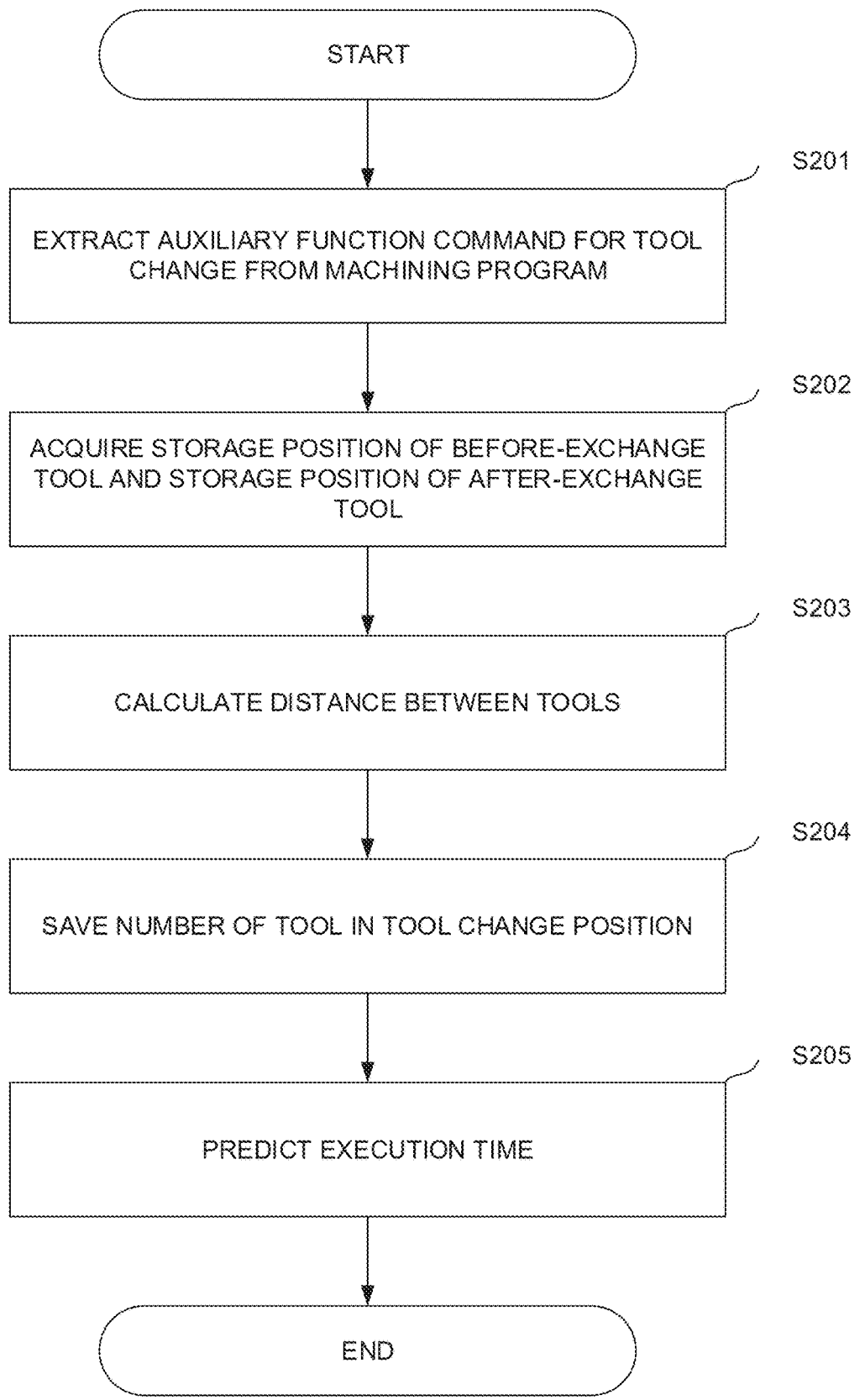
FIG. 6 is a flowchart showing an operation of the machining time prediction system including the machining time prediction device.

An operation of the machining time prediction system 1000 including the machining time prediction device 1 will be described with reference to FIGS. 5 and 6.

<Preparation Stage 1>

In Preparation Stage 1, the numerical controller 2 performs collection of information on the tool position, actual measurement of the tool change time, and the like and constructs the database 3 such as that shown in FIG. 3.

Step S101: The tool change auxiliary function command extraction unit 201 extracts the auxiliary function command for tool change from the machining program stored in the storage unit 205 when the machining program is executed.

Step S102: When the numerical controller 2 executes the auxiliary function command for tool change extracted in Step S101, the tool change time measurement unit 204 measures the time required for the execution of the function related to this auxiliary function command. Thus, the measured value of the time required for the tool change is acquired.

Step S103: When the numerical controller 2 executes the auxiliary function command for tool change extracted in Step S101, the tool position calculation unit 202 for positions before and after tool change acquires the number of the storage position of a before-exchange tool (or a tool in a tool change position) and the number of the storage position of an after-exchange tool (or a tool scheduled to move to the tool change position by tool change), according to the prior art.

Moreover, the tool position calculation unit 202 for positions before and after tool change obtains the distance between tools at the time of the tool change. The distance between tools can be obtained by measuring, for example, the actual moving distance (rotational angle) of the tool changer, in the present embodiment, the tool position calculation unit 202 for positions before and after tool change can also calculate the distance between tools by calculating the absolute value of the difference between the number of the storage position of a before-exchange tool (or a tool in a tool change position) and the number of the storage position of an after-exchange tool (or a tool scheduled to move to the tool change position by tool change).

Step S104: The tool change time measurement unit 204 adds to the database 3 a new record in which the command code of the auxiliary function command for tool change extracted in Step S101, the tool change time measured in Step S102, the number of the storage position of a before-exchange tool (or a tool a tool change position) and the number of the storage position of an after-exchange cool (or a tool scheduled to move to the tool change position by tool change) acquired in Step S103, and the distance between tools are associated with each other.

Preferably, the numerical controller 2 may be configured to previously measure execution times for all combinations of before-exchange tools and after-exchange tools in Preparation Stage 1. By doing this, the execution time can be measured highly accurately in the preparation stage described below.

<Preparation Stage 2>

Preparation Stage 2 is processing that is performed immediately before the prediction stage described below. Information including the storage positions of ail the tools in the tool changer, the tool change position the tool changer, and the number of the tool in the tool change position is set in the storage unit 105 of the machining time prediction device 1. The machining time prediction device 1 performs processing of the prediction stage described below, based on the premise of the set tool change position or the like.

<Prediction Stage>

The machining time prediction device 1 performs processing for predicting the execution time of the auxiliary function for tool change.

Step S201: The tool change auxiliary function command extraction unit 101 analyzes the machining program stored in the storage unit 105 and extracts the auxiliary function command for tool change.

Step S202: The tool position calculation unit 102 for positions before and after tool change acquires the number of the tool currently located in the tool change position with reference to the storage unit 105, that is, obtains the number of the storage position of a before-exchange tool. Moreover, it obtains the number of the storage position of an after-exchange tool (or a tool scheduled to move to the tool change position by tool change) specified by the auxiliary function command for tool change extracted in Step S201, with reference to the storage positions of all the tools stored in the storage unit 105.

Step S203: The inter-tool distance calculation unit 103 obtains the distance between tools by calculating the absolute value of the difference between the number of the storage position of a before-exchange tool and the number of the storage position of an after-exchange tool, obtained in Step S202.

Step S204: The tool position calculation unit 102 for positions before and after tool change updates the number of the tool in the tool change position held by the storage unit 105 to the number of the storage position of an after-exchange tool obtained in Step S202. The updated information is used for next-time prediction.

Step S205: The tool change time prediction unit 104 predicts the execution time of the auxiliary function command for tool change based on the distance between tools that is obtained in Step S203 and the information accumulated in the database 3.

A specific example of the execution time prediction processing will be described with reference to FIG. 3.

(1) Case where the database 3 contains one or more records that include combinations of the number of the storage position of a before-exchange tool and the number of the storage position of an after-exchange tool, obtained in Step S202:

The tool change time prediction unit 104 extracts one or more corresponding records from the database 3. An average of execution times included in these records is treated as a predicted value.

For example, let us assume that the numbers of the storage position of a before-exchange tool is three and the number of the storage position of an after-exchange tool is one. The database 3 of FIG. 3 contains two records (Nos. 1 and 4) in which the numbers of the storage position of a before-exchange tool is three and the number of the storage position of an after-exchange tool is one. Therefore, the tool change time prediction unit 104 acquires execution times individually from these records and calculates an average, $(30+31)/2=30.5$, of them. This average 30.5 is output as the predicted value of the auxiliary function command for tool change.

(2) Case where the database 3 contains one or more records that include the distance between tools that is obtained in Step S203:

The tool change time prediction unit 104 extracts one or more corresponding records from the database 3. An average of execution times included in these records is treated as a predicted value.

For example, let us assume that the distance between tools that is obtained in Step S203 is 2. The database 3 of FIG. 3 contains three records (Nos. 1, 3 and 4) in which the distance between tools is 2. Therefore, the tool change time prediction unit 104 acquires execution times individually from these records and calculates an average, $(30+33+31)/2=31.3$, of them. This average 31.3 is output as the predicted value of the auxiliary function command for tool change.

(3) Cases other than Cases (1) and (2):

The tool change time prediction unit 104 predicts the execution time by a statistical method based on the database 3:

For example, let us assume that the distance between tools which is obtained in Step S203 is 3. The database 3 of FIG. 3 contains no records in which the distance between tools is 3. In this case, the tool change time prediction unit 104 extracts distances between tools and execution times individually from a plurality of records stored in the database 3 and obtains an approximate expression indicative of the relationship between the distance between tools and the execution times. Thereafter, the tool change time prediction unit 104 can obtain the predicted value of the execution time by applying the distance between tools=3 obtained in Step S203 to this approximate expression.

For example, the distance between tools and the execution times extracted from the records Nos. 1 to 4 of FIG. 3 can be approximated to a straight line $y=9.3x+12.7$, as shown in the graph of FIG. 7. Here y and x are the execution time and the distance between tools, respectively. According to this approximate expression, the execution time for the distance between tool $x=3$ is 40.6. The tool change time prediction unit 104 outputs this value 40.6 as the predicted value of the execution time of the auxiliary function command for tool change.

While any of Cases (1) to (3) can be arbitrarily selected, it is preferred, in view of the prediction accuracy and processing load, to select (1) with the highest priority, then (2), and finally (3).

According to the present embodiment, the machining time prediction device 1 can accurately predict the execution time of the auxiliary function command for tool change according to information including the shape and rotation direction of a tool storage device, and those positions in the tool storage device in which the tools are stored.

The following is a description of the configuration of a machining time prediction device 1 according to Embodiment 2 of the present invention.

In Example 1 described above, the method for predicting the execution time of an auxiliary function command for tool change is described on the assumption that the tool changer is circular in shape and always rotates clockwise, as shown in FIG. 4. In Example 2, however, a method for predicting the execution time of the auxiliary function command for tool change will be described on the assumption that the tool changer is of different type from that as shown in FIG. 4.

As shown in FIG. 8, some circular tool changers are configured to select a rotation direction, clockwise or counterclockwise, so that the moving distance (rotational angle) from the tool position before tool change to the tool position after tool change is minimal. For the tool changers of this type, the machining time prediction device 1 cannot estimate the distance between tools by the method according to Embodiment 1.

In this case, as shown in FIG. 9, for example, the storage unit 105 can be configured to previously store data defining a correspondence relation between the respective numbers of the storage position of a before-exchange tool and the storage position of an after-exchange tool and the distance between tools. Also, in Step S203 of the prediction stage, the inter-tool distance calculation unit 103 of the machining time prediction device 1 can acquire the distance between tools by referring to these data.

Figure 10:
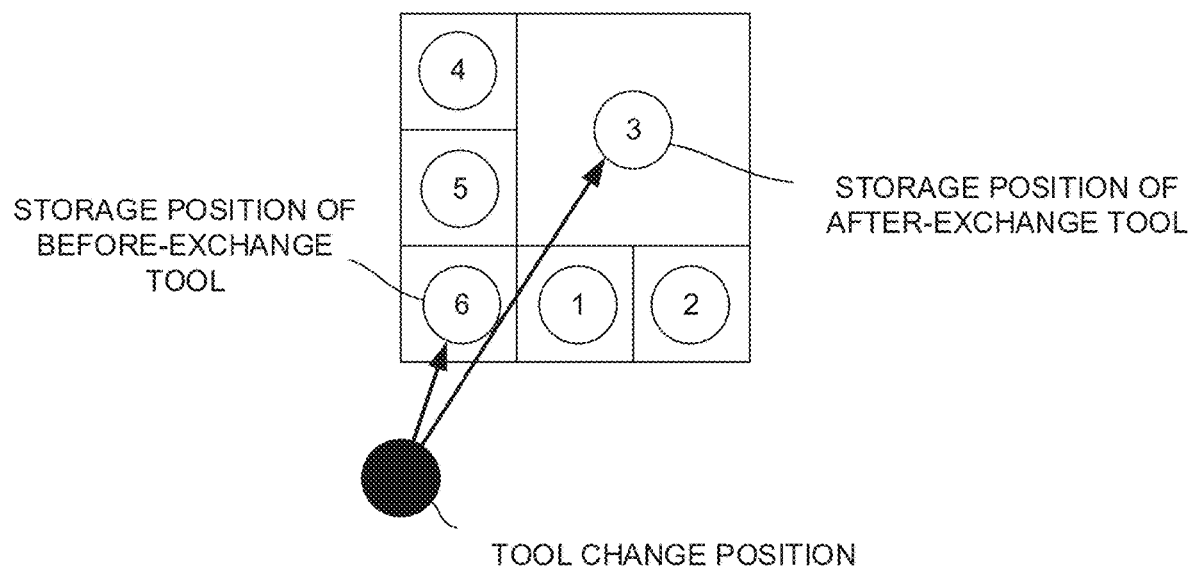
FIG. 10 is a diagram showing an example of the tool changer.

Moreover, as shown in FIG. 10, there is a tool changer in which tools stored in a rack are picked up by a reciprocating motion starting at a predetermined tool change position. The tool changer of this type first moves from the tool change position to a predetermined storage position of a before-exchange tool to return the tool and then returns to the tool change position, at the time of tool change. Subsequently, the tool changer moves from the tool change position to a predetermined storage position of an after-exchange tool to acquire the tool and then returns to the tool change position.

Also in the tool changer of this type, as described above, the storage unit 105 can be configured to previously store data defining a correspondence relation between the respective numbers of the storage position of a before-exchange tool and the storage position of an after-exchange tool and the distance between tools. The distance between tools can be obtained by calculating "a round-trip distance from the tool change position to the storage position of a before-exchange tool"+"a round-trip distance from the tool change position to the storage position of an after-exchange tool".

Figure 11:
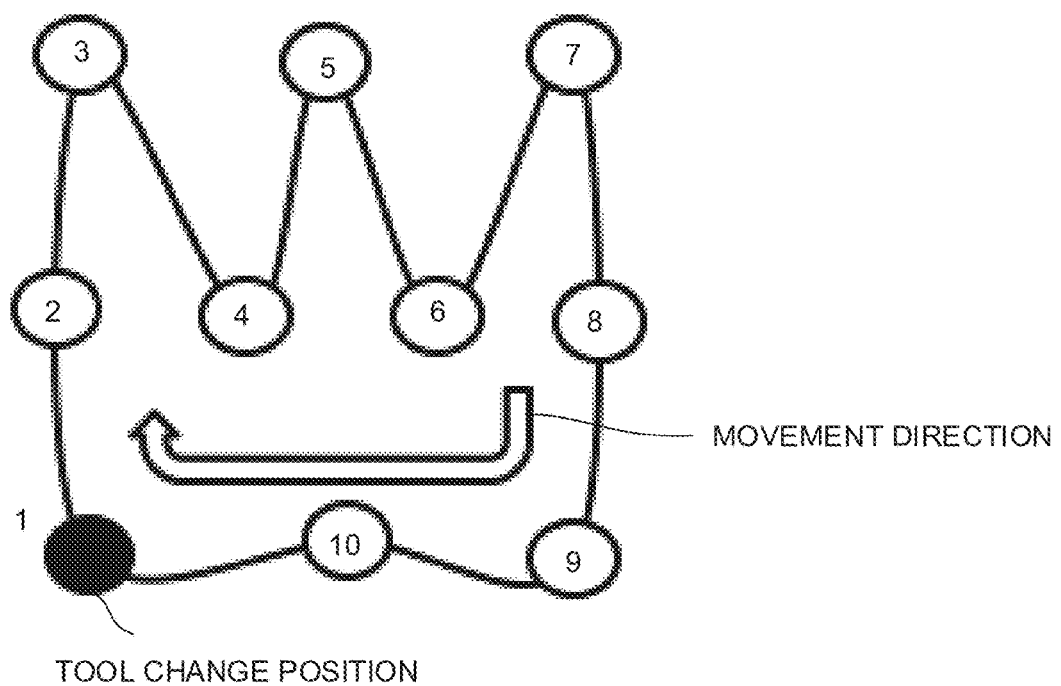
FIG. 11 is a diagram showing an example of the tool changer.

The present invention is not limited to Embodiments 1 and 2 described above and may be suitably modified and embodied in various forms. In Embodiment 1, for example, the method for predicting the execution time of the auxiliary function command for tool change is described on the premise that a tool changer is circular and always rotates clockwise, as shown in FIG. 4. However, the method of Embodiment 1 is not limited to the tool changer of this type, but is applicable to tool changers of various types characterized in that tools are sequentially replaced, as shown in FIG. 11.

Figure 12:
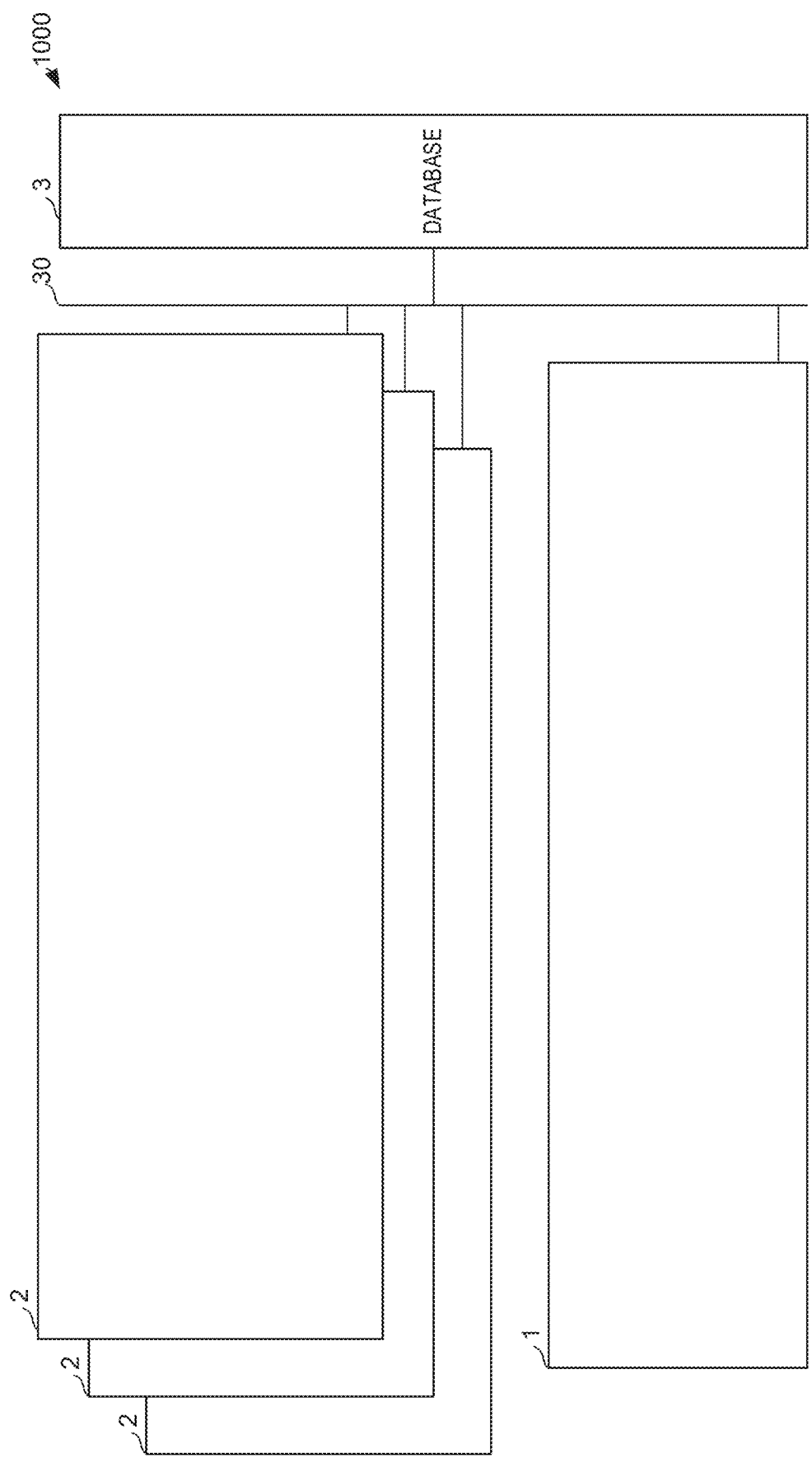
FIG. 12 is a block diagram showing a modification of the machining time prediction system including the machining time prediction device.

Moreover, in the embodiments described above, the single numerical controller 2 is assumed to operate in Preparation Stage 1. However, the present invention is not limited to this, and data may be collected from a plurality of numerical controllers 2 into the database 3, as shown in FIG. 12, for example. In this case, tool changers controlled by the numerical controllers 2 should preferably be provided with mechanisms of the same kind.

Furthermore, in the above-described embodiments, data on the specific tool changer are assumed to be accumulated in the database 3. However, the present invention is not limited to this, and data may be accumulated in the database 3 for each of the manufacturers and model names of the tool changers. Typically, the manufacturers and the model names can be added as record elements. Thus, the present invention can easily be applied to tool changers of various types.

The invention claimed is:

1. A machining time prediction device configured to predict an execution time of an auxiliary function for tool change, the machining time prediction device comprising:
    a processor configured to:
        extract an auxiliary function command for tool change from a machining program,
        calculate a storage position of a before-exchange tool and a storage position of an after-exchange tool, based on the auxiliary function command,
        calculate a distance between tools, based on the storage position of a before-exchange tool and the storage position of an after-exchange tool, and
        predict the execution time of the extracted auxiliary function command for tool change with reference to a database in which the distance between tools is associated with an actual value of the auxiliary function execution time for tool change.

2. A machining time prediction device configured to predict an execution time of an auxiliary function for tool change, the machining time prediction device comprising:
    a tool change auxiliary function command extraction unit configured to extract an auxiliary function command for tool change from a machining program;
    a tool position calculation unit for positions before and after tool change configured to calculate a storage position of a before-exchange tool and a storage position of an after-exchange tool, based on the auxiliary function command;
    an inter-tool distance calculation unit configured to calculate a distance between tools, based on the storage position of a before-exchange tool and the storage position of an after-exchange tool; and
    a tool change time prediction unit configured to predict the execution time of the extracted auxiliary function command for tool change with reference to a database in which the distance between tools is associated with an actual value of the auxiliary function execution time for tool change,
    wherein the tool change time prediction unit performs the prediction based on data of the database which includes the same distance between tools as the distance between tools that is calculated by the inter-tool distance calculation unit.

3. A machining time prediction device configured to predict an execution time of an auxiliary function for tool change, the machining time prediction device comprising:
    a tool change auxiliary function command extraction unit configured to extract an auxiliary function command for tool change from a machining program;
    a tool position calculation unit for positions before and after tool change configured to calculate a storage position of a before-exchange tool and a storage position of an after-exchange tool, based on the auxiliary function command;
    an inter-tool distance calculation unit configured to calculate a distance between tools, based on the storage position of a before-exchange tool and the storage position of an after-exchange tool; and
    a tool change time prediction unit configured to predict the execution time of the extracted auxiliary function command for tool change with reference to a database in which the distance between tools is associated with an actual value of the auxiliary function execution time for tool change,
    wherein the database associates the storage position of a before-exchange tool and the storage position of an after-exchange tool with the actual value of the auxiliary function execution time for tool change, and the tool change time prediction unit performs the prediction based on data of the database which includes the storage position of a before-exchange tool and the storage position of an after-exchange tool being the same as the storage position of a before-exchange tool and the storage position of an after-exchange tool which are calculated by the tool position calculation unit for positions before and after tool change.

4. A machining time prediction device configured to predict an execution time of an auxiliary function for tool change, the machining time prediction device comprising:
    a tool change auxiliary function command extraction unit configured to extract an auxiliary function command for tool change from a machining program;
    a tool position calculation unit for positions before and after tool change configured to calculate a storage position of a before-exchange tool and a storage position of an after-exchange tool, based on the auxiliary function command;
    an inter-tool distance calculation unit configured to calculate a distance between tools, based on the storage position of a before-exchange tool and the storage position of an after-exchange tool; and
    a tool change time prediction unit configured to predict the execution time of the extracted auxiliary function command for tool change with reference to a database in which the distance between tools is associated with an actual value of the auxiliary function execution time for tool change,
    wherein the tool change time prediction unit performs the prediction by using an approximate expression generated based on the database.

5. The machining time prediction device according to claim 1, wherein the actual value of the auxiliary function execution time for tool change is actually measured by a numerical controller connected to the machining time prediction device and saved in the database.

6. The machining time prediction device according to claim 1, wherein the processor is configured to perform the prediction based on data of the database which includes the same distance between tools as the calculated distance between tools.

7. The machining time prediction device according to claim 1, wherein
the database associates the storage position of a before-exchange tool and the storage position of an after-exchange tool with the actual value of the auxiliary function execution time for tool change, and
the processor is configured to perform the prediction based on data of the database which includes the storage position of a before-exchange tool and the storage position of an after-exchange tool being the same as the calculated storage position of a before-exchange tool and the calculated storage position of an after-exchange tool.

8. The machining time prediction device according to claim 1, wherein the processor is configured to perform the prediction by using an approximate expression generated based on the database.

9. The machining time prediction device according to claim 2, wherein the actual value of the auxiliary function execution time for tool change is actually measured by a numerical controller connected to the machining time prediction device and saved in the database.

10. The machining time prediction device according to claim 3, wherein the actual value of the auxiliary function execution time for tool change is actually measured by a numerical controller connected to the machining time prediction device and saved in the database.

11. The machining time prediction device according to claim 4, wherein the actual value of the auxiliary function execution time for tool change is actually measured by a numerical controller connected to the machining time prediction device and saved in the database.

\* \* \* \* \*